J. FROELICH.
INTERNAL COMBUSTION ENGINE.
APPLICATION FILED DEC. 3, 1915.
1,322,422.
Patented Nov. 18, 1919.
6 SHEETS—SHEET 4.
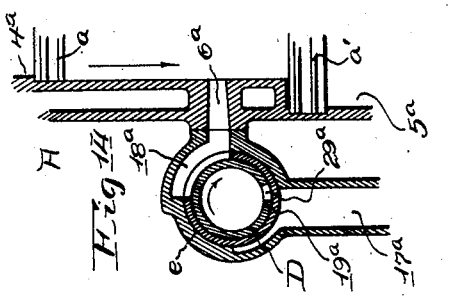
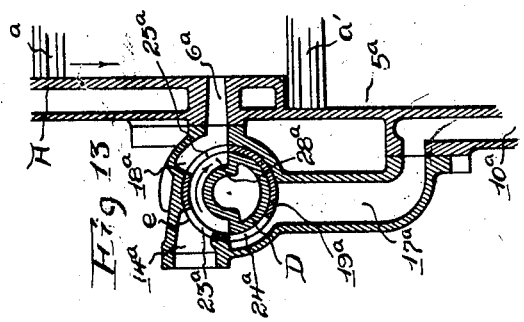
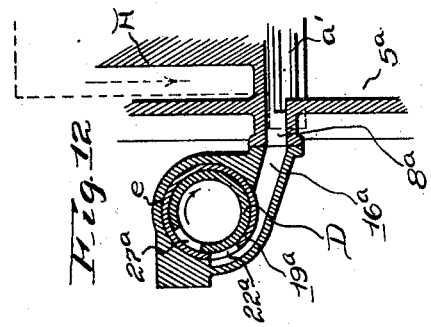
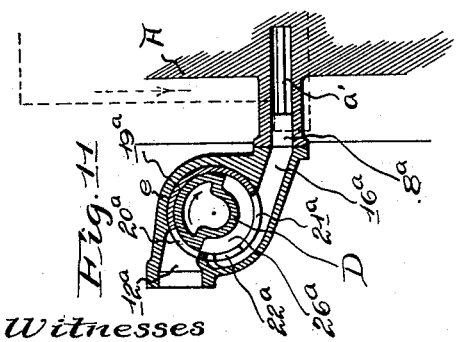
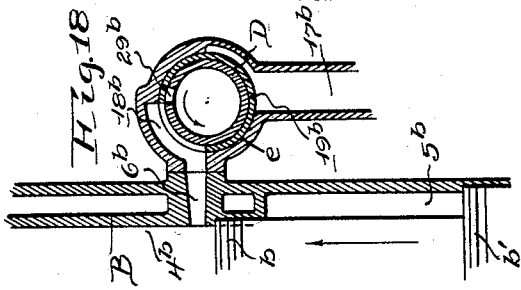
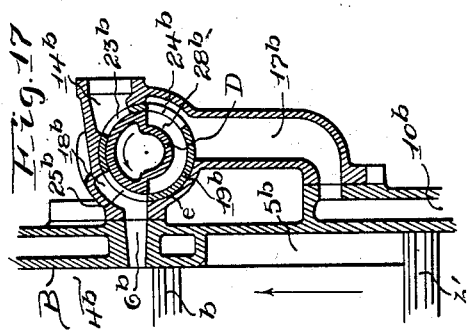
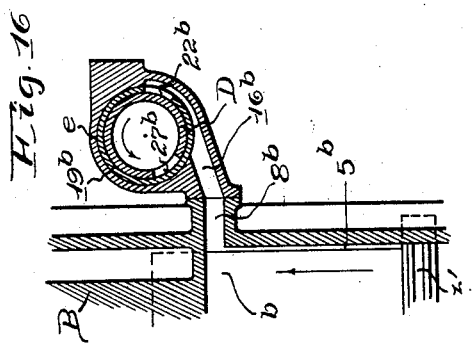
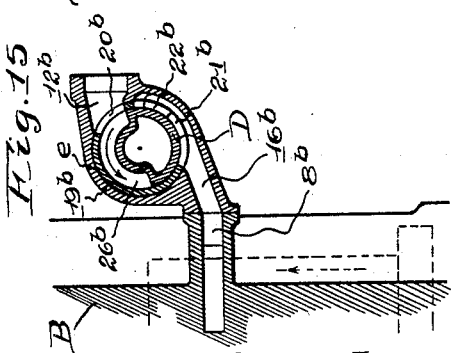
Witnesses
P. C. Caswell
J. K. Humphrey
Inventor
John Froelich
by John E. Stryker  Atty.

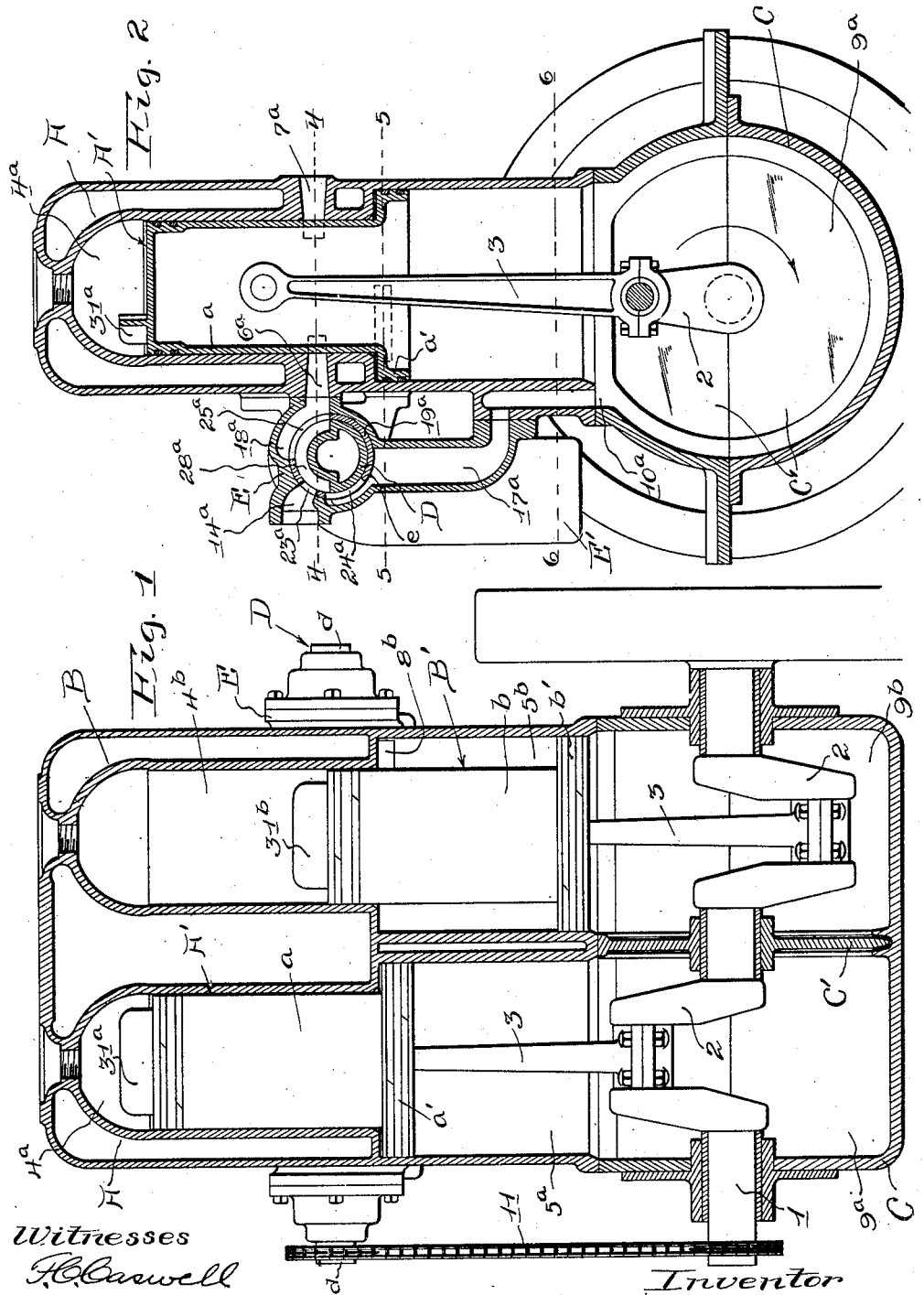

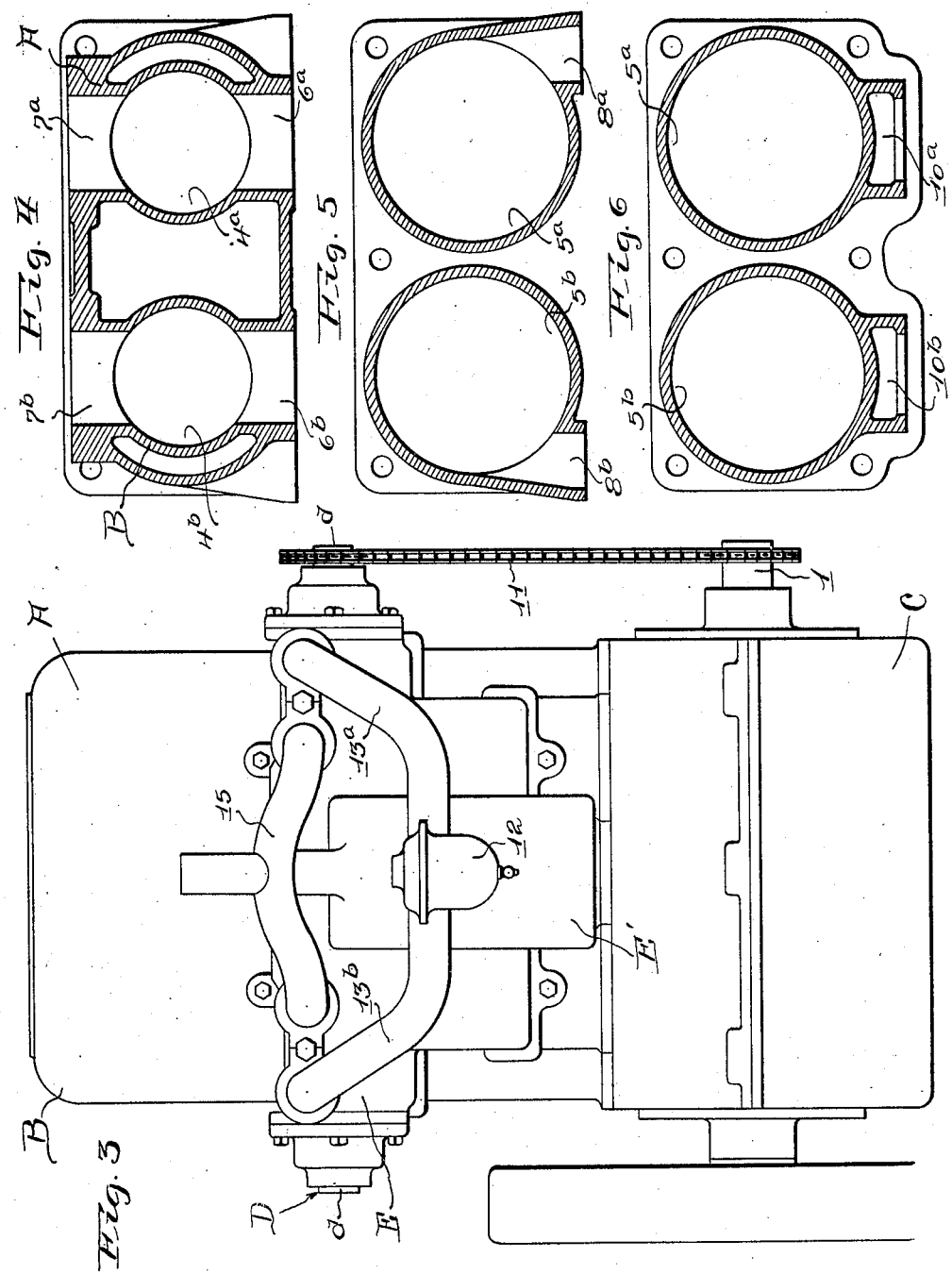

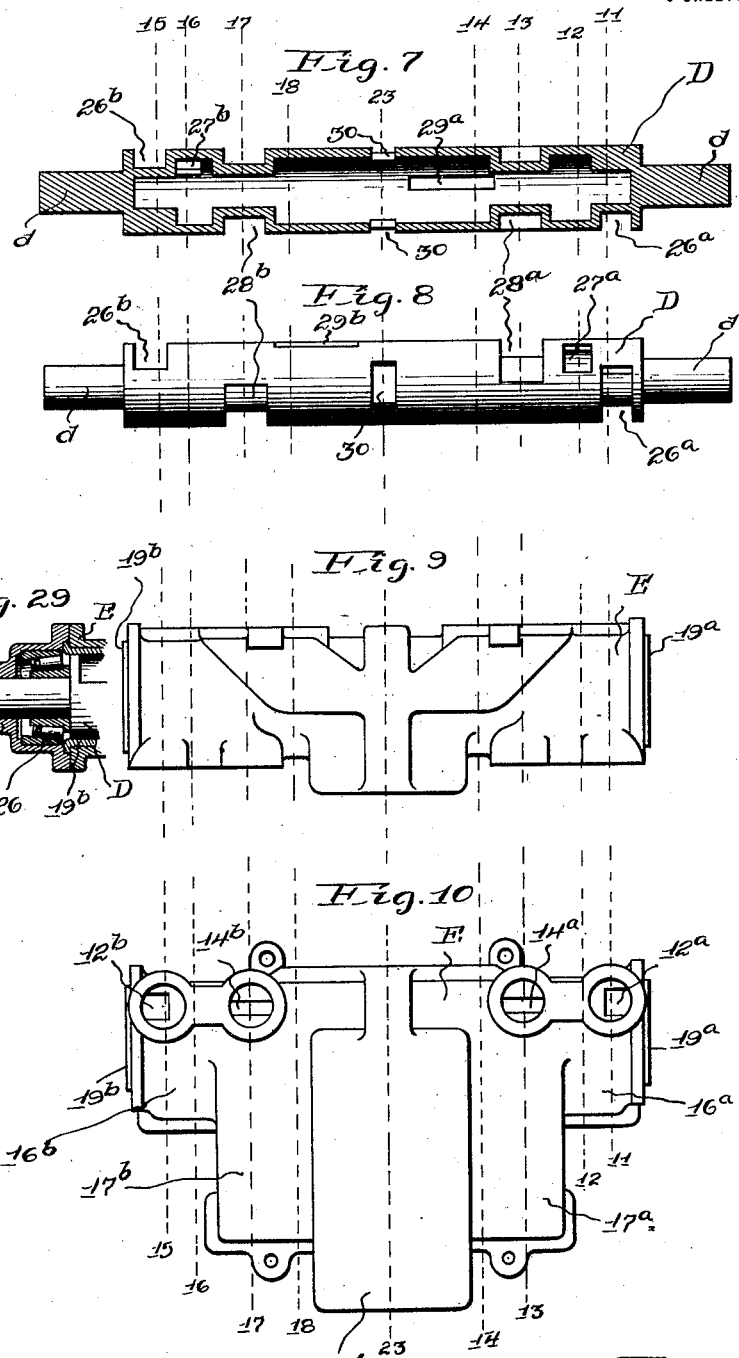

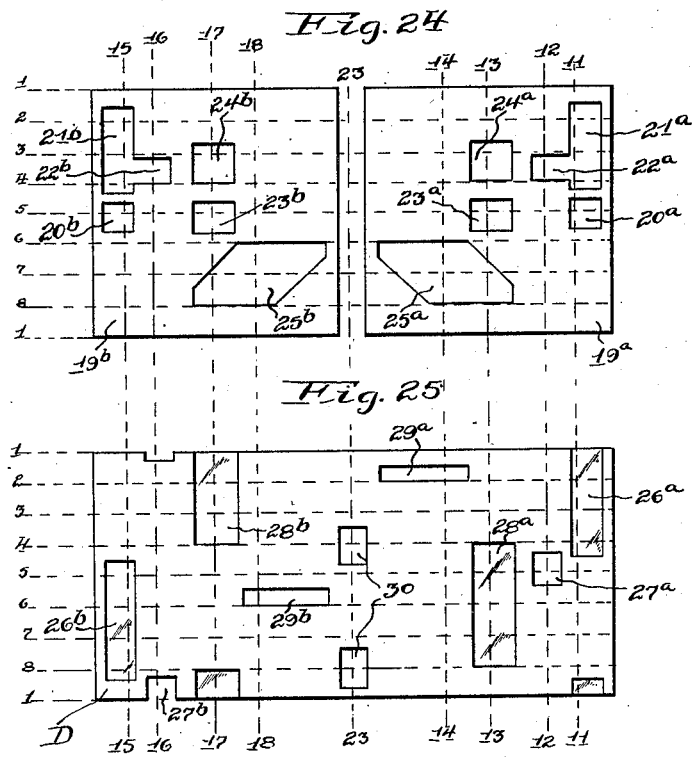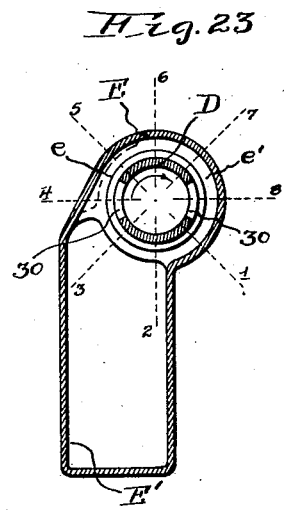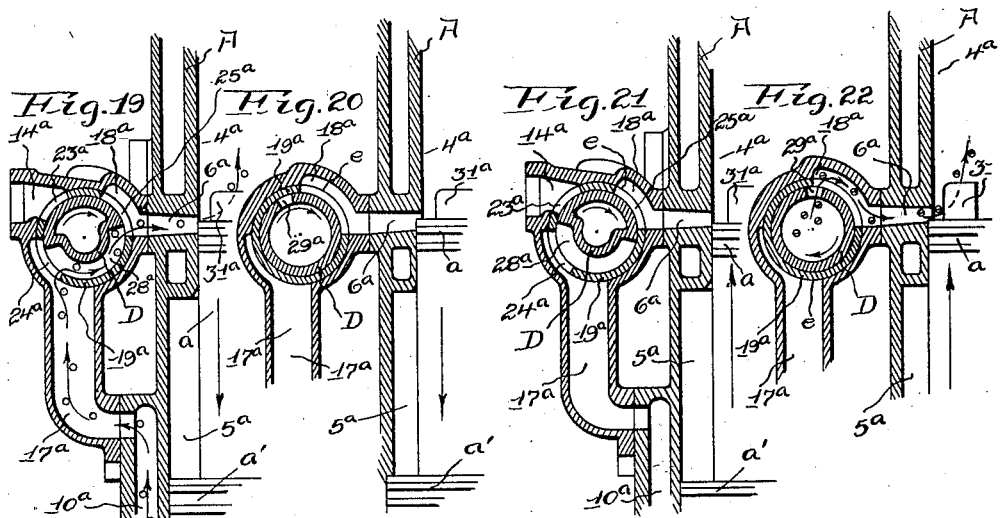

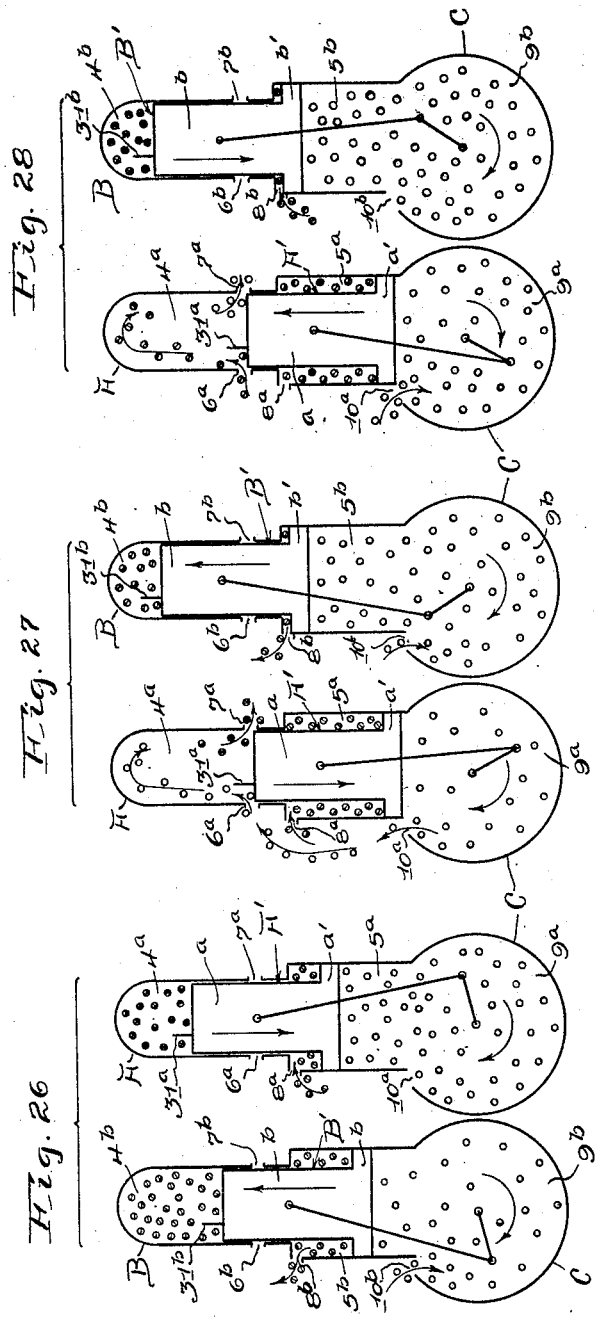

UNITED STATES PATENT OFFICE.

JOHN FROELICH, OF ST. PAUL, MINNESOTA.

INTERNAL-COMBUSTION ENGINE.

1,322,422.  Specification of Letters Patent.  Patented Nov. 18, 1919.

Application filed December 3, 1915. Serial No. 64,890.

*To all whom it may concern:*

Be it known that I, JOHN FROELICH, a citizen of the United States, residing at St. Paul, in the county of Ramsey and State of Minnesota, have invented new and useful Improvements in Internal-Combustion Engines, of which the following is a specification.

My invention relates to improvements in internal combustion engines and more particularly to those of the two cycle type, in which the cylinders are arranged in pairs and coöperate with each other in the introduction of fuel.

The general objects of the invention are to provide a simple and efficient engine of this class having means for thoroughly scavenging the cylinders after each explosion and for introducing charges of fuel of uniform quantity and composition into the cylinders and also to produce an operating cycle in which the scavenging and the introduction of charges of fuel shall be so related as to result in increased efficiency.

To attain these objects I provide a pair of differential cylinders furnished with oppositely working differential pistons and employ a crank case having a closed compartment for each cylinder. The smaller compartment of each differential cylinder constitutes the explosion chamber, and the larger compartment is the pump chamber for the gaseous fuel. The compartments in the crank case serve as air compression chambers for the scavenging air. A transfer or storage chamber, which receives gas from the pump chamber of one cylinder and delivers it into the explosion chamber of the other cylinder is also provided. This transfer chamber is formed as a part of the valve casing and the passage of scavenging air and fresh gases is controlled entirely by a single rotary valve in said casing.

This mechanism has been evolved to operate in the following cycle: When the piston of one cylinder has nearly completed its forward stroke the exhaust port in the explosion chamber is uncovered thereby allowing said chamber to be relieved of dead gases. The inlet port is also uncovered by said piston and air (which has been drawn into the crank case of said cylinder upon the previous return stroke and compressed in said chamber upon the forward stroke of the piston) is permitted to rush into said explosion chamber and drive out the remaining burnt gases through the exhaust port. At the beginning of the return stroke of said piston, fresh gas from the transfer chamber (which has been drawn from a carbureter into the pump chamber of the other cylinder upon the last forward stroke of its piston and forced into said transfer chamber upon the return stroke thereof) is admitted through the intake port in the explosion chamber in sufficient volume to fill the same and expel the scavenging air therefrom.

My invention also includes various novel features of construction, which are hereinafter particularly described and pointed out in the claims.

In the drawings, Figure 1 is a central longitudinal sectional view of my improved engine; Figure 2 is a central transverse sectional view, taken through one of the engine cylinders; Fig. 3 is a side elevation of the engine; Figs. 4, 5 and 6 are detail sectional views, showing the ports in the engine cylinders and are respectively taken through said cylinders on the lines 4—4, 5—5, 6—6 of Fig. 2; Fig. 7 is a longitudinal central sectional view in detail of the rotary valve; Fig. 8 is a side elevation thereof; Fig. 9 is a plan view in detail of the valve casing; Fig. 10 is a side elevation of the same; Figs. 11 to 18 are detail sectional views illustrating various parts of the valve and valve casing and also show the relation between the pistons and said valve; said sectional views are taken respectively on the lines indicated at 11—11, 12—12, 13—13, 14—14, 15—15, 16—16, 17—17 and 18—18 on each of Figs. 7, 8, 9, 10, 24 and 25; Figs. 19 to 22 are views similar to Figs. 13 and 14 and show the pistons and valve in different relative positions; Fig. 23 is a sectional view in detail, showing a portion of the valve and transfer chamber and is taken on the lines indicated by 23—23 in Figs. 7, 8, 9, 10, 24 and 25; Fig. 24 is a diagrammatical plan view of the inner periphery of the bushings within the valve casing showing the formation and location of the ports therein and bearing reference lines numbered 1 to 8, said lines corresponding in number and position with the radial lines in Fig. 23; Fig. 25 is a similar diagrammatical plan view of the outer periphery of the valve; Figs. 26, 27 and 28 are diagrammatical views, each showing both cylinders of the engine with the moving parts in different relative positions, together with a representation of the position and movement of air, fresh gas and burnt gas—the air being indicated by circles, the gas by circles with a diametrical line therein and the burnt gas by circles with a cross therein. Similar diagrammatic illustration of air and gas is also shown in Figs. 19 and 22 respectively. Fig. 29 is a fragmentary sectional view of the valve casing.

Referring to the accompanying drawings, I have used the reference letters A and B to indicate the differential cylinders. These cylinders are identical and are mounted side by side upon a crank case C having therein a removable dividing wall C' formed of separable sections adapted to separate said crank case into compartments, one for each cylinder. A crank shaft 1 revoluble in the crank case C is formed with a crank 2 in each compartment, said cranks being arranged at 180 degrees with respect to each other. Differential pistons A' and B' within the cylinders are connected by pitmen 3 with said cranks 2 and move in opposite directions.

The differential cylinders A and B comprise respectively explosion chambers $4^a$, $4^b$ and pump chambers $5^a$ and $5^b$, said pump chambers being enlargements of the explosion chambers and located in axial alinement therewith. The explosion chambers $4^a$, $4^b$ are respectively furnished with inlet ports $6^a$, $6^b$ and with exhaust ports $7^a$, $7^b$ and are provided at their upper ends with the usual spark plugs (not shown) for igniting the gas in said cylinders. Said pump chambers $5^a$, $5^b$ are respectively provided at their upper ends with a common inlet and outlet port $8^a$, $8^b$, which permits the passage of gas into and out of said chamber. The compartments or air compression chambers $9^a$, $9^b$ in the crank case C are each provided with a common inlet and outlet port numbered $10^a$, $10^b$ respectively. The differential pistons A' and B' comprises respectively working pistons $a$ and $b$ and pump pistons $a'$ and $b'$, the former fitting the explosion chambers $4^a$, $4^b$ and the latter the pump chambers $5^a$, $5^b$. The working pistons $a$ and $b$ compress gas within the explosion chambers $4^a$, $4^b$ and receive impulses upon the ignition of the gas, while the pump pistons $a'$ and $b'$ serve a double purpose, namely, to draw gas into the pump chambers $5^a$, $5^b$ and expel the same therefrom and also to draw air into the air compression chambers $9^a$, $9^b$ and compress said air therein.

A valve casing E containing a tubular rotary valve D is secured horizontally upon the sides of the cylinders A and B, and said valve is rotated at the same rate as the crank shaft 1 through suitable gearing, such as a sprocket or toothed chain 11 connecting the valve D and crank shaft. Cast integrally with the valve casing E is the transfer or storage chamber E' which communicates with said valve. This valve casing is formed with conduits leading to the valve, which bring said valve into communication with the inlet ports of the explosion chambers $4^a$, $4^b$, pump chambers $5^a$, $5^b$ and air compression chambers $9^a$, $9^b$, and also with a carbureter 12 or other suitable source of gaseous fuel supply and the outer air. Said valve is designed (as will be hereinafter specifically pointed out) to permit the inflow of air from without to the air compression chambers $9^a$, $9^b$ in the crank case and direct the same therefrom into the explosion chamber of the same cylinder, also to permit the inflow of fuel charges from the carbureter 12 to alternate pump chambers and direct the charges from each of said chambers, first, into the transfer chamber E', then, into the explosion chamber of the companion cylinder.

The valve casing E is a single casting having a longitudinal bore $e$ for the valve D, a recess, comprising the transfer chamber E' communicating with the bore $e$ through an annular channel $e'$ and the following conduits and channels opening into said bore: conduits $12^a$, $12^b$ at the outer side of the casing connected through pipes $13^a$, $13^b$ with the carbureter 12; conduits $14^a$, $14^b$ also on the outer side of the casing opening through a pipe 15 into the outer air; depending conduits $16^a$, $16^b$ leading respectively to the common inlet and outlet ports $8^a$, $8^b$ in the pump chambers $5^a$, $5^b$; depending conduits $17^a$, $17^b$ leading respectively to the common inlet and outlet ports $10^a$, $10^b$ of the air compression chambers $9^a$, $9^b$, and channels $18^a$, $18^b$ on the upper side of the casing opening respectively into the inlet ports $6^a$, $6^b$ of the explosion chambers $4^a$, $4^b$.

Machined bushings $19^a$ and $19^b$, having ports therein registering with the conduits and channels in the valve casing, are removably inserted in the ends of the bore $e$ in similar angular relation to snugly receive the valve D and further provide for accurately fixing the points of ingress and egress to and from said valve. The inner ends of these bushings extend to the edges of the annular channel $e'$ in the bore $e$ of the valve casing E, but do not obstruct said channel. Said bushings $19^a$ and $19^b$ are provided with ports designated as follows: ports $20^a$, $20^b$, registering respectively with the gas inlet conduits $12^a$, $12^b$ in the valve casing E; ports $21^a$, $21^b$ registering respectively with the gas conduits $16^a$, $16^b$ leading to the pump chambers; ports $22^a$, $22^b$ also registering respectively with said gas conduits $16^a$, $16^b$; ports $23^a$, $23^b$ registering respectively with the air inlet conduits $14^a$, $14^b$; ports $24^a$, $24^b$ registering respectively with the air conduits $17^a$, $17^b$, leading to the compression chambers $9^a$, $9^b$ in the crank case C, and ports $25^a$, $25^b$ registering respectively with the channels $18^a$, $18^b$ which open into the inlet ports $6^a$, $6^b$ of the explosion chambers $4^a$, $4^b$.

The valve D is a hollow cylinder having journals $d$ at its ends and is revolubly mounted in the bushings $19^a$, $19^b$. The journals $d$ turn in roller bearings 26 mounted in bearing supports 27, secured upon the ends of the valve casing E, and one of said journals $d$ is lengthened to pass through its support and furnish a means of connection with the gearing 11 operated by the crank shaft 1.

Said valve is supplied with the following designated openings and channels arranged to register at certain periods in its rotation with the ports in the bushings $19^a$, $19^b$: transverse channels $26^a$, $26^b$, registering respectively with the ports $20^a$, $21^a$ and $20^b$, $21^b$; openings $27^a$, $27^b$ registering respectively with ports $22^a$, $22^b$; transverse channels $28^a$, $28^b$ registering respectively with the ports $23^a$, $23^b$ and $24^a$, $24^b$ and $25^a$, $25^b$; openings $29^a$, $29^b$, registering respectively with said ports $25^a$ and $25^b$, and openings 30 in the middle of the valve communicating continuously with the annular channel $e'$ in the valve casing E, which opens into the transfer chamber E'.

The openings and channels at one end of the valve, whose reference numerals bear the letter "a" are identical in size and number with the openings and channels in the other end of the valve, which bear the same numerals with the letter "b" and the corresponding openings and channels in said ends occupy similar longitudinal positions, but at one end are diametrically opposed to those at the other end.

The openings $29^a$, $29^b$ in the valve D, which permit the movement of gas from said transfer chamber E' are so placed with respect to the intake openings $27^a$, $27^b$ in said valve that the gas is compressed in said transfer chamber before each charge of fuel is delivered to an explosion chamber and when a passage way is cleared by the valve between said transfer chamber and one of the explosion chambers the gas confined in said transfer chamber expands and completely fills said explosion chamber at atmospheric pressure. The channels $18^a$, $18^b$ and inlet ports $6^a$, $6^b$, of course, contain some of the expanded gases, but this inappreciable quantity is supplied from that theretofore compressed within the hollow portion of the valve D.

The operation of my engine will now be described, taking as a convenient starting point in the operating cycle the explosion of a charge in one of the cylinders. Beginning with an explosion in the cylinder A (see Fig. 26), the differential piston A' moves downward on its forward stroke, the piston $a$ compressing the air in the compression chamber $9^a$, at present closed by the valve D (Fig. 13), and drawing gas from the carbureter, through the transverse channel $26^a$ in the valve (Fig. 11), into the pump chamber $5^a$. The differential piston B' in the companion cylinder B is carried upward, during said downward stroke of the differential piston A', and its piston $b$ draws a supply of air, through the channel $28^b$ in the valve D (Fig. 17), into the compression chamber $9^b$ and compresses the gas for a short interval in the pump chamber $5^b$, then forces said gas into the valve through the opening $27^b$ (Fig. 16) thence out through the openings 30 in said valve into the transfer chamber E' (Fig. 23). Just before the piston $a$ in the cylinder A reaches the end of its forward stroke (see Fig. 27), the inlet and exhaust ports $6^a$ and $7^a$ of the explosion chamber $4^a$ are uncovered by said piston. The uncovering of the exhaust port $7^a$ releases the burnt gases and the opening of the inlet port $6^a$ permits the inflow of scavenging air from the air compression chamber $9^a$ through the channel $28^a$ in the valve D (Fig. 19). This inflowing current of scavenging air strikes the baffle plate $31^a$ on the top of the piston $a$ and is first deflected upward to reach and drive out all of the burnt gases through the exhaust port $7^a$. The companion piston B' at this time is completing the compression of the gas in the explosion chamber $4^b$, also completing the expulsion of the gas from the pump chamber $5^b$ and further, completing the intake of air to the compression chamber $9^b$. At the beginning of the return stroke of the piston A' in said cylinder A (Fig. 28) and before the inlet and exhaust ports $6^a$ and $7^a$ are covered by the piston $a$, a charge of gas from the transfer chamber E' rushes through said intake port into the explosion chamber $4^a$. In reaching this explosion chamber said gas first passes from the transfer chamber E' through the openings 30 into the valve (Fig. 23), then passes out of the valve through the opening $29^a$ (Fig. 22), whence it is conducted through the channel $18^a$ and said inlet port $6^a$ to said explosion chamber $4^a$. The influx of said gas displaces the scavenging air, as said scavenging air had displaced the burnt gas, thus resulting in supplying said explosion chamber with a complete charge of fresh gas at atmospheric pressure, upon the initial return movement of the piston A'. Continued upward movement of said piston A' operates to compress the gas within the explosion chamber $4^a$, force the gas from the pump chamber $5^a$ through the valve D into the transfer chamber E' via the port $27^a$ (Fig. 12) and ports 30 (Fig. 23), and also draws air through the transverse channel $28^a$ in the valve (Fig. 13) into the compression chamber $9^a$. This completes one turn of the crank shaft and said operation is repeated upon each revolution thereof.

Having described my invention, what I claim as new and desire to protect by Letters Patent, is:

1. In an internal combustion engine, a plurality of coöperating cylinders, a valve casing, including a transfer chamber formed with passageways therein, said casing being secured upon the cylinders, a hollow rotary valve in the casing communicating constantly with said transfer chamber and provided with ports arranged to register with the passageways in said casing, said ports being adapted to receive gas from a suitable source of supply and allow the escape of said gas to said cylinders.

2. In an internal combustion engine, a pair of differential cylinders with oppositely working pistons therein, each cylinder comprising an explosion chamber and a pump chamber, the latter being adapted to supply gas for the explosion chamber of the companion cylinder, a carbureter, a valve casing including a transfer chamber and conduits leading from said carbureter to the pump chambers, and a single hollow rotary valve within said casing communicating continuously with said transfer chamber and provided with openings to permit and time the flow of gas into and out of said valve through said conduits.

3. In an internal combustion engine, a pair of operating units each having an explosion chamber, a pump chamber and an air compression chamber, a carbureter, a valve casing secured upon said cylinders and inclosing a transfer chamber, said casing being formed with conduits communicating with the chambers of each cylinder and also with said carbureter and the atmosphere, and a hollow rotary valve in said casing constantly opening into said transfer chamber and provided with channels to permit the passage of air from the air compression chamber of one cylinder to the explosion chamber of the same cylinder, also having channels to permit the passage of gas from the carbureter to the pump chambers and formed with openings to permit the reception of gas from each pump chamber and to allow the escape of gas to the explosion chamber of the other cylinder.

4. In an internal combustion engine, a pair of differential cylinders, each comprising a pump chamber and an explosion chamber having a single inlet port and an exhaust port; a crank case divided into compartments, one for each cylinder; a differential piston, for each differential cylinder, comprising a piston arranged to uncover the inlet and outlet ports at the end of its forward stroke, and a pump piston adapted to draw gas into the pump chamber and expel the same therefrom and also draw air into the crank case and compress said air therein, a transfer chamber, conduits connecting the pump chamber of each cylinder through said transfer chamber with the inlet port of the explosion chamber in the other cylinder; conduits connecting the crank case of each cylinder with the inlet port in the same cylinder and a single rotary valve designed to control the passage of air and gas in said conduits, so as to successively admit air and gas into each explosion chamber during the period when the inlet and exhaust valves are uncovered by their respective working pistons.

5. In an internal combustion engine, a pair of differential cylinders, each cylinder having a pump chamber and an explosion chamber with an inlet and an exhaust port therein, a crank case, a removable wall arranged to divide the crank case into air compression chambers, one for each cylinder, pistons in said cylinders working in opposite directions, a carbureter, a valve casing including a transfer chamber and having a longitudinal bore therein, said bore communicating through passageways with the atmosphere and with said transfer chamber, carbureter, explosion chambers, pump chambers and air compression chambers, a hollow valve revoluble in said bore, said valve having a plurality of ports and channels adapted to register with the conduits in the valve casing, said valve being also adapted to admit air from without to the air compression chambers and direct the same from each cylinder into the corresponding explosion chamber and to admit the inflow of gas into the pump chamber of one cylinder, then direct said gas therefrom into the transfer chamber and finally admit gas from said transfer chamber into the explosion chamber of the other cylinder.

6. In an internal combustion engine, a pair of differential cylinders, each cylinder having a pump chamber and an explosion chamber with an inlet and an exhaust port therein, a crank case divided into air compression chambers, one for each cylinder, pistons in said cylinders working in opposite directions, a carbureter, a valve casing including a transfer chamber and having a longitudinal bore therein, said bore communicating through passageways with the atmosphere and with said transfer chamber, carbureter, explosion chambers, pump chambers and air compression chambers, removable bushings in said bore having ports therein communicating with the passageways in the valve casing, a hollow valve revoluble in said bore, and provided with journals at its ends, bearing supports secured upon the ends of the valve casing and roller bearings in said supports for said journals, said supports being adapted to secure said bushings, in said valve casing, said valve having a plurality of openings and channels adapted to register with the conduits in the valve casing, said valve being also adapted to admit air from without to the air compression chambers and direct the same from each cylinder into the corresponding explosion chamber and to admit the inflow of gas into the pump chamber of one cylinder, then direct said gas therefrom into the transfer chamber and finally admit gas from said transfer chamber into the explosion chamber of the other cylinder.

7. In an internal combustion engine, a pair of differential cylinders, each comprising an explosion chamber having an inlet and exhaust port and a pump chamber formed with a common inlet and outlet port therein, a crank case divided into air compression chambers, one for each cylinder, each chamber being supplied with a common inlet and outlet opening, oppositely working pistons in said cylinders, a carbureter, a valve casing having a longitudinal bore therein, said casing inclosing a transfer chamber and having a plurality of conduits opening into said bore, viz.; conduits $12^a$, $12^b$ leading to the carbureter, conduits $14^a$, $14^b$ to the atmosphere, conduits $17^a$, $17^b$ to the air compression chambers and conduits $16^a$, $16^b$ to the pump chambers, said bore having an annular channel communicating with the transfer chamber and channels $18^a$, $18^b$ each of which opens into the inlet port of one explosion chamber, removable bushings in the ends of said valve casing, formed with ports registering with said conduits and diverging channels, a hollow tubular valve, revoluble in said bushings, having a channel at each end to permit the introduction of air through conduits $14^a$, $14^b$, thence through conduits $17^a$, $17^b$ to the air compression chambers, whence the same may escape through the inlet ports into the explosion chambers, said valve also having a channel in each end to permit the introduction of gas from the carbureter through conduits $12^a$, $12^b$, thence through the conduits $16^a$, $16^b$ to the pump chambers, said valve being further provided with an opening at each end to receive gas from said conduits $16^a$, $16^b$ as the same is expelled from the respective pump chambers, said valve being also formed with a plurality of central openings constantly communicating through said annular channel with the transfer chamber and with an opening in each end to permit the delivery of gas from the valve into each of the diverging channels, thence through the inlet ports into the explosion chambers, said openings and channels in said valve being so arranged that the charges of air and gas pass into each cylinder successively during the period when the exhaust port of that cylinder is open.

8. In an internal combustion engine, a plurality of coöperating cylinders, a valve casing having passageways therein and an integral transfer chamber communicating therewith, a hollow rotary valve in said casing formed with openings providing constant communication between said chamber and the interior of the valve and also supplied with openings arranged to register with the passageways in said casing, whereby gas is permitted to enter the chamber through the valve and pass from said chamber through said valve directly into the cylinders.

9. In an internal combustion engine, a plurality of coöperating cylinders, a valve casing having a longitudinal bore therein enlarged at one point to form an annular channel and also provided with conduits and with channels opening into said cylinders, a chamber communicating with said annular channel, said casing having therein a hollow rotary valve provided with openings which communicate constantly with said chamber through said annular channel and further provided with openings and channels communicating with said channels leading to said cylinders, whereby both air and gas are conducted to said cylinders.

Whereof, I have hereunto subscribed my name to this specification.

JOHN FROELICH.